Oct. 5, 1965  E. H. EDWARDS  3,209,444

COTTON PICKER BAR PIVOT BUSHING EXTRACTING TOOL

Filed Aug. 8, 1963

INVENTOR.
Estel H. Edwards
BY
John J. Kowalik
Atty.

United States Patent Office 3,209,444
Patented Oct. 5, 1965

---

3,209,444
COTTON PICKER BAR PIVOT BUSHING
EXTRACTING TOOL
Estel H. Edwards, Memphis, Tenn., assignor to International Harvester Company, Chicago, Ill., a corporation of New Jersey
Filed Aug. 8, 1963, Ser. No. 300,829
4 Claims. (Cl. 29—256)

This invention relates to a novel tool for removing the bushing from the lower end of a cotton picker bar.

Heretofore, it has been extremely difficult to remove the pivot bar bushing and resort was had to chiseling and pounding the bushing out. This had the effect of flaring the lower end of the picker tube so that the replacement bushing fit loosely and the pivoting action of the bar was impaired and wear was accelerated and also facilitated entry of dirt into the picker bar. Furthermore, because of looseness, the oil would run out thus starving the bar for lubrication.

A general object of the invention is to provide a novel, simple tool which can be readily applied to the bar and which easily extracts the bushing member therefrom.

A still further object of the invention is to provide a novel, simple, and effective tool which comprises threaded parts such that one part reacts against the inner edge of the lower pivot bushing and pursuant to rotation of the other part, which reacts against other components of the bar, the bushing is easily forced out of the lower end of the bar.

A further object of the invention is to provide a novel tool wherein the components are easily manipulated and inserted in situ in the bar. More specifically the invention contemplates providing a bushing puller for a cotton picker bar which has a spindle holder and a hollow tube behind the holder, the tube and the holder having intersecting bores and the tube having an end portion with a bushing in the bore thereof adjacent to the bore of the holder below a spindle drive means which is in the tube and provides a reaction surface which is engaged by a bolt extended through the bushing and threaded onto a nut which is insertable above the bushing through the bore in the holder and held in position by a handle connected to the nut and extending outwardly of the holder, the bolt being rotatable to urge the nut downwardly whereby the bushing is forced downwardly out of the end portion of the tube.

These and other objects and advantages inherent in and encompassed by the invention become more readily apparent from the specification and drawings, wherein.

Figure 1:
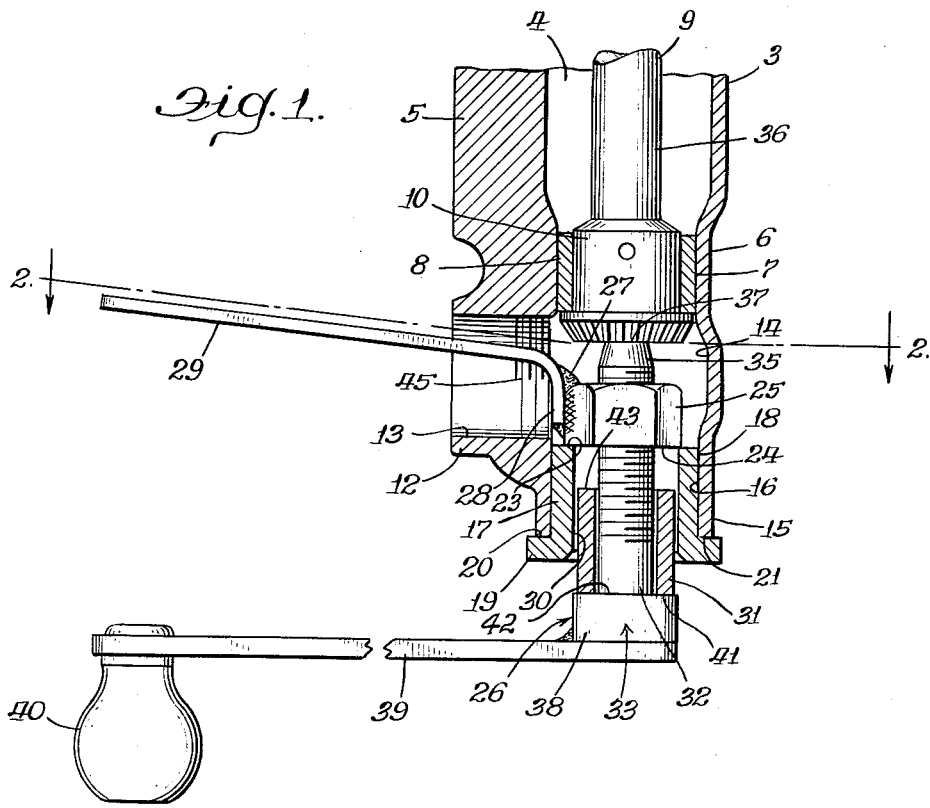
FIGURE 1 is a vertical sectional view through the lower portion of the cotton picker bar with the tool applied thereto and shown in side elevation.
Figure 2:
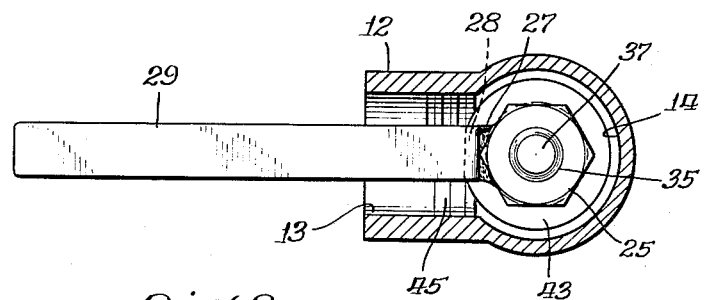
FIGURE 2 is a cross sectional view taken substantially on the line 2—2 of FIGURE 1.

Describing the invention in detail and having particular reference to the drawings, there is shown a lower end portion of a conventional picker bar 3 which comprises a hollow tubular portion 4 with a front edge spindle holder structure 5. It will be seen that the tubular portion 4 is indented as at 6 at several intervals to provide lands 7 for the purpose of supporting and sustaining bearings 8 which serve as mountings and holders for the drive shaft 9 and the bevel gears 10. The spindle holder structure 5 is provided with a plurality of vertically spaced socket portions 12 which are apertured as at 13, the aperture at 13 extending into and communicating with the internal bore 14 of the rear tubular portion 4. It will be seen that the opening 13 is transverse to the opening or bore 14 and that immediately adjacent the lowermost socket portion 12 there is provided on the portion 4 a cylindrical lower end portion 15 which provides a cylindrical internal bore 16 which admits a complementary cylindrical bearing 17, the outer periphery 18 of which is in close confinement and engagement with the bore surface 16. The cylindrical bearing 17 has an outturned lower flange 19 which provides a shoulder 20 which abuts against the lower edge 21 of the lower end portion 15 of the cotton picker bar. The bearing 17 has an upper edge 23 which is below the lower side of the bore 13 in the lowermost socket portion 12 and provides an abutment surface for the under-edge or side 24 of the reaction nut 25 of the extractor tool generally designated 26.

The nut 25 has one of its lateral sides connected as by welding at 27 to a down-turned portion 28 of a handle 29 which extends from the upper edge of the portion 28 laterally outwardly with respect to the axis of the nut 25. The nut 25 is dimensioned to fit through the opening 13 into the bore 14 and to seat on top of the bearing 17 at its edge 23. It will be seen that the bushing 17 has an internal cylindrical bore 30 which admits a spacer sleeve 31 on and about the threaded shank portion 32 of the bolt part 33 of the extractor. The spacer 31 is a cylindrical member which fits loosely within the bore 30 which controls canting of the shank portion 32 and at the same time serves as a guide or alignment means for aligning the upper end 35 of the bolt portion with the center of the gear 10 substantially on the center line or axis 35 of the shaft assembly 9. It will be understood that the bearings 8 are relatively tightly pressed against the respective lands 7 and that there are a plurality of these (that is five). The displacement of the shaft assembly and the bearings mounting the same to the column structure is prevented by shaft 36 being secured at the upper end of the picker bar to a shoulder (not shown) on the shaft against a bearing (not shown) held in the bar by a snap ring as well known to those skilled in the art, whereby upon rotation of the shank 32 and threading the same into the nut 25, the end 35 reacting as at 37 against the gear structure 10 will cause the nut 25 to thread downwardly onto the shank 32 as the bolt, which has a head 38 connected to the crank 39, is rotated by the handle 40 which constitutes part of the crank 39. It will be seen that the spacer or guide sleeve 31 seats at its lower end 41 against the upper side 42 of the head and that the upper edge 43 is adapted to butt against the under side 24 of the nut after a predetermined withdrawal of the bearing 17 occurs. This prevents the handle portion 29 from being forcibly urged against the threads 45 in the socket portion 12. It will be noted that the portion 28 of the handle 29 plus the width of the nut 25 is less than the diameter of the lower end portion 15 of the support column 3 whereby the portion 28 is allowed to move downwardly below the lower side of the bore 13 of the socket portion 12.

It will be appreciated that a novel, simple, and effective tool has been provided which accommodates withdrawal of the lower pivot bushing or bearing to an extent whereby the same may be grasped by a common extractor such as pliers and withdrawn. Furthermore, the instant tool does not require dissembly of the entire bar, that is withdrawal of the shaft assembly 9, etc., or complete removal of the bar from the remainder of the mechanism in order to service the lower bearing 17.

Having described a preferred form of the invention, it will be understood that various other signs and devices will become readily apparent to those skilled in the art as suggested by the appended claims.

What is claimed is:
1. A puller for a lower pivot bushing of a cotton picker bar having a spindle holder and a hollow tube portion back of the holder, and said tube portion having a bore and said holder having a bore intersecting the bore of the tube portion and said tube having a lower end por- tion with a cylindrical internal periphery and a bushing within said periphery having an edge portion adjacent to the bore in the holder, and spindle drive means in the tube portion above the bore in the holder providing a reaction surface, said puller comprising a nut portion insertable into said bore in the tube above the bushing through the bore in the holder, a handle on one side of the nut projecting laterally therefrom through the bore in the holder, a bolt structure extending through the bushing and threaded through the nut portion and having an end abutting said reaction surface, said bolt adapted to be rotated in a direction threading the bolt into the nut whereby the nut is engaged with said edge of the bushing and urges the bushing axially outwardly of the bar.

2. The invention according to claim 1 and said bolt having a head without the bar, and a spacer sleeved over the bolt in guiding relation to the interior of the bushing and having an axial length limiting threading of the nut onto the bolt.

3. The invention according to claim 1 and a crank connected to the end of the bolt remote from said first mentioned end thereof.

4. The invention according to claim 1 and said bushing having a bore, and said bolt having a head of a diameter less than the diameter of said bore in the bushing.

References Cited by the Examiner

UNITED STATES PATENTS

| | | | |
|---|---|---|---|
| 1,608,800 | 11/26 | Martin | 29—263 |
| 2,622,465 | 12/52 | Kanter | 29—254 X |

WILLIAM FELDMAN, *Primary Examiner.*

MYRON C. KRUSE, *Examiner.*